C. H. REEDER.
CUTTING MACHINE.
APPLICATION FILED FEB. 4, 1910.

968,196.

Patented Aug. 23, 1910.

2 SHEETS—SHEET 1.

Witnesses:
Geo. R. Ladson
Nills L. Church

Inventor:
Charles H. Reeder
by Paul Bakewell
Atty.

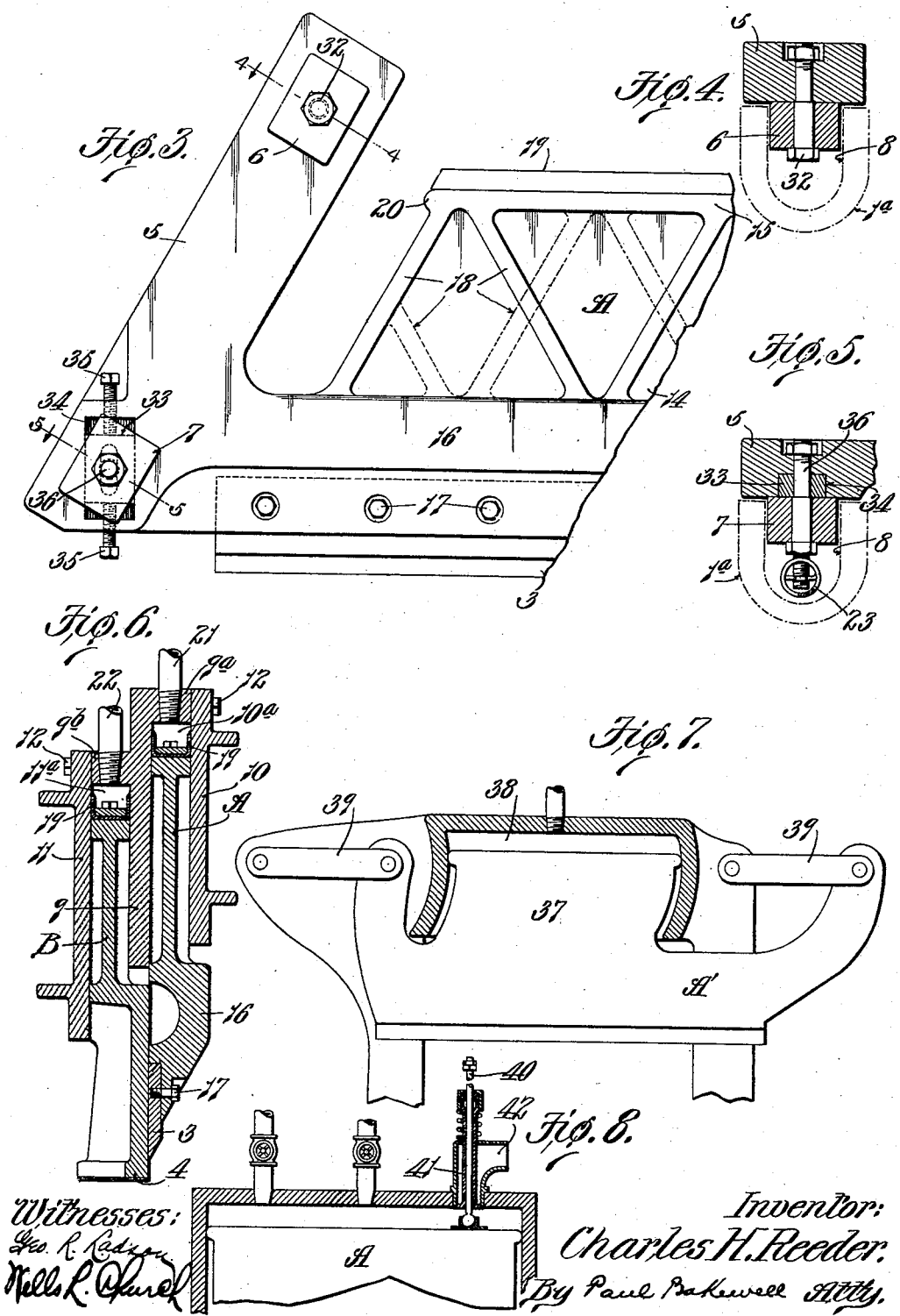

UNITED STATES PATENT OFFICE.

CHARLES H. REEDER, OF ST. LOUIS, MISSOURI.

CUTTING-MACHINE.

968,196.  Specification of Letters Patent.  Patented Aug. 23, 1910.

Application filed February 4, 1910. Serial No. 542,129.

*To all whom it may concern:*

Be it known that I, CHARLES H. REEDER, a citizen of the United States, residing at St. Louis, Missouri, have invented a certain new and useful Improvement in Cutting-Machines, of which the following is a full, clear, and exact description, such as will enable others skilled in the art to which it appertains to make and use the same.

This invention relates to machines which comprise a reciprocating tool carrier, and particularly to machines which are adapted to operate on comparatively massive work, such, for example, as the cutting machines that are used for shearing large sheets of metal and other material.

One object of my invention is to provide a machine of improved construction which is so designed that the tool on the reciprocating carrier will exert a uniform pressure throughout its entire length on the work being operated on.

Another object is to provide a comparatively light-weight machine which is strong enough to withstand the strains to which it is subjected and which can be manufactured at a low cost, and still another object is to provide a fluid or hydraulically-operated machine which requires a comparatively small amount of pressure to operate it.

Other objects and desirable features of my invention will be hereinafter pointed out.

I have herein shown my invention embodied in a cutting machine which is so designed that the cutter moves transversely in passing through the work so as to sever the work with a draw-cut, but I wish it to be understood that my invention is not limited to such a machine, for my broad idea is applicable to various other types of machines which comprise a reciprocating tool-carrier.

Figure 1:
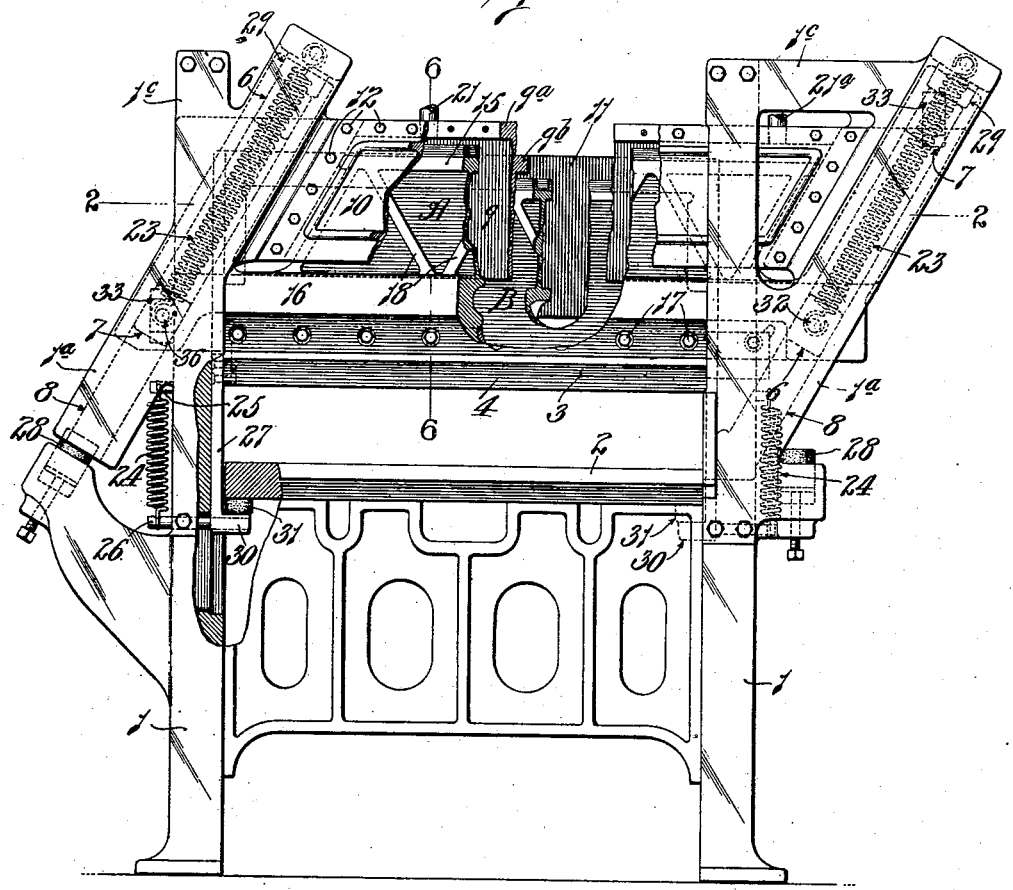
Figure 2:
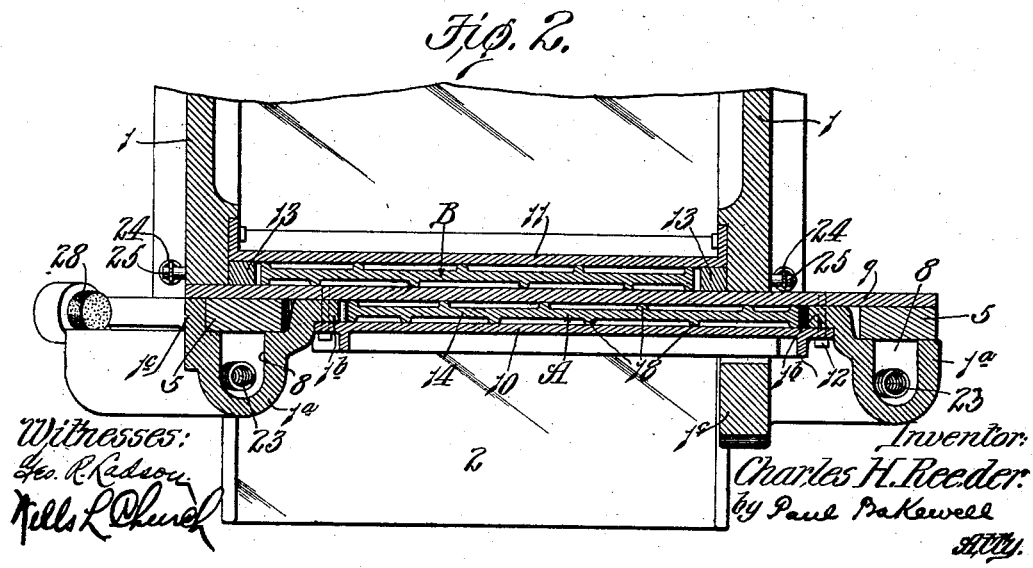

Figure 1 of the drawings is a front elevational view of a cutting machine constructed in accordance with my invention, a portion of said figure being broken away to more clearly illustrate certain parts of the machine; Fig. 2 is a horizontal sectional view taken on approximately the line 2—2 of Fig. 1; Fig. 3 is a front elevational view of a portion of the cutter-carrier; Figs. 4 and 5 are sectional views taken on approximately the lines 4—4 and 5—5 of Fig. 3; Fig. 6 is a vertical sectional view taken on approximately the line 6—6 of Fig. 1; Fig. 7 is a detail view illustrating my invention applied to a cutting machine having a reciprocating cutter that travels in a curved path through the work; and Fig. 8 is a detail sectional view of the device that can be used on some types of machine for controlling the movement of the piston in one direction.

Referring to the drawings which illustrate the preferred form of my invention, 1 designates the side frames of the machine, and 2 designates the table or support on which the work rests.

The cutting device consists of a knife 3 that is carried by a member A which reciprocates in a vertical plane, and the work-clamp 4 is also connected to a vertically reciprocating member B which is arranged at the rear of the member A, as shown in Figs. 1, 2 and 6. The side frames are provided with inclined guides $1^a$ that embrace inclined portions 5 on the knife-carrying member A, and said inclined portions 5 are provided with guide blocks 6 and 7 that project into grooves 8 formed in the rear faces of the stationary guides $1^a$ so as to cause the knife-carrying member to move transversely when it descends, and thus cause the work to be severed with a draw-cut.

A division plate 9 is arranged between the members A and B which carry the cutter and the work-clamp, and front and rear cover plates 10 and 11 are arranged parallel to said division plate so as to form two chambers $10^a$ and $11^a$ that receive the member A and the member B, respectively. The lower ends of these chambers are open, as shown in Fig. 6, but the upper ends of said chambers are closed, preferably by means of horizontally disposed flanges $9^a$ and $9^b$ on the division plate 9. These three plates, namely, the division plate and the front and rear cover plates, are securely connected together and also to the side frames of the machine by suitable fastening devices 12. The end walls of the chamber $10^a$ are formed by flanges $1^b$ on the inclined guides $1^a$ that lie between the front cover plate and the division plate, as shown in Fig. 2, and the end walls of the chamber $11^a$ are formed by strips 13 that are interposed between the division plate and the rear cover plate.

The cutter-carrier member A and also the work-clamp-carrying member B are of substantially the same construction and are so designed that they form pistons which reciprocate in the chambers 10ª and 11ª. The cutter-carrying member A, which is illustrated clearly in Fig. 3, consists of a vertical web 14 provided at its upper edge with a flange or head 15 that fits snugly between the side walls of the chamber 10ª, and at its lower edge with a heavier flange 16 that constitutes a knife-bar, the knife 3 being arranged in a pocket in the rear face of said knife-bar so that it will bear snugly against the front face of the work-clamp 4, as shown in Fig. 6. If desired, the pocket in which the knife 3 is arranged can be provided with an end wall against which the right hand end of the knife bears so as to reduce the strain on the bolts 17 which retain the knife in position when the knife is passing through the work. I prefer to arrange a number of oppositely inclined diagonal ribs 18 on both sides of the web 14 of the member A and connect the upper and lower ends of said ribs to the top and bottom flanges 15 and 16 of said web so as to produce a girder structure that is strong and light, these ribs being so designed that they bear against the side walls of the chamber 10ª and thus prevent the member A from wabbling.

A strip of packing 19 is secured to the head 15 of the member A so as to produce a perfectly tight joint between said head and the walls of the chamber in which it operates, and the ends 20 of said head are preferably rounded off slightly, as shown in Fig. 3. The work-clamp-carrying member B also consists of a vertical web provided at its upper and lower edges with top and bottom flanges between which oppositely inclined diagonal ribs are arranged, the top flange or head having a strip of packing secured thereto and the lower flange having the work-clamp 4 secured thereto.

Any suitable expansible medium such, for example, as air, gas or a liquid under pressure, can be used for actuating the cutter-carrier and the work-clamp-carrier. The machine herein shown is provided with supply-pipes 21 and 22 that communicate with the upper ends of the chambers 10ª and 11ª, respectively, and exhaust pipes that also communicate with said chambers, one of said exhaust pipes being designated by the reference character 21ª in Fig. 1. Suitable valves, not shown, are provided for controlling the admission and exhaust of the operating medium into and out of the chambers 10ª and 11ª. The downward pressure which the operating fluid exerts on the pistons A and B causes said pistons to move downwardly, and as said pistons extend throughout the entire length of the cutter and the work-clamp mounted thereon, said devices engage the work or bear upon the work evenly and with a uniform pressure.

Another advantage of mounting the cutter and the work-clamp directly on the pistons which operate them is that I reduce the number of parts of the operating mechanism to a minimum and consequently I am able to manufacture the machine at a lower cost than if links and levers were arranged between the pistons and the carriers for imparting movement thereto. Furthermore, my machine requires less power to operate it than machines of the type heretofore in use because the pressure is applied directly to the cutter and to the work-clamp, and still another desirable feature of my machine is that a comparatively light-weight member can be used for carrying the cutter in view of the fact that the power is applied to said member in such a manner that it is not subjected to uneven strains. While I prefer to provide each chamber or piston cylinder of the machine with a supply-pipe and a return pipe, it will, of course, be obvious that a single pipe could be used for admitting and exhausting the pressure from each cylinder.

Any suitable means can be employed for elevating the cutter and the work-clamp or returning them to normal position. In the construction herein shown, the means for elevating the cutter-carrier consists of contractile springs 23 that are connected at their upper ends to stationary devices on the inclined guides 1ª of the side frames, and at their lower ends to devices on the cutter-carrier A, as shown in broken lines in Fig. 1. The means for returning the work-clamp-carrier to its elevated position consists of contractile springs 24 that are connected at their upper ends to stationary devices 25 on the side frames, and at their lower ends to pins 26 which project laterally from depending legs 27 on the member B. The side frames are provided with adjustable buffers 28 that limit the downward movement of the cutter-carrier and buffers 29 that limit the upward movement of said carrier. The depending legs 27 on the member B are provided with laterally projecting extensions 30 that coöperate with the buffers 31 on the under side of the work-table so as to limit the upward movement of the work-clamp-carrier. In the construction herein shown, the inclined guides 1ª are carried by brackets 1ᶜ that are detachably connected to the side frames so as to enable the parts of the machine to be assembled easily, but as these brackets form part of the side frame I have described the side frames as being provided with inclined guides.

As previously stated, the inclined portions 5 of the cutter-carrier A are provided with blocks 6 and 7 that project into slots 8 in the inclined guides 1ª on the side frames so as to cause the cutter-carrier to travel in an inclined path when it moves downwardly.

The block 6, which is located at the upper end of the inclined portion 5 at the left hand end of the cutter-carrier, is merely connected thereto by a bolt 32 which extends through said parts, as shown clearly in Fig. 4, and the block 6 that is located at the lower end of the inclined portion 5, at the right hand end of the cutter-carrier, is retained in position in a similar manner. The blocks 7, however, which are located at the lower end of the inclined portion 5 at the left hand end of the cutter-carrier and at the upper end of the inclined portion 5 at the right hand end of said carrier, are adjustably mounted so that they can be shifted or moved slightly so as to adjust the cutter-carrier in a perfectly horizontal position.

Referring to Figs. 3 and 5 which clearly illustrate the construction of one of the blocks 7, the reference character 33 designates a filler that is arranged in a pocket 34 formed in the front face of the inclined portion 5 of the member A, and 35 designates screws that bear against the upper and lower ends of said filler for retaining it in adjusted position. The block 7 is retained in position by means of a bolt 36 that passes through holes in the block and in the filler 33 and also through an elongated slot in the inclined portion 5 of the carrier A. If the cutter-carrier A gets out of alinement or shifts from a horizontal position the bolts 35 can be manipulated so as to raise or lower the fillers 33 and thus shift the block 7 at the lower left hand end of the cutter-carrier and at the upper right hand end of said carrier, the rounded ends 20 of the head 15 of the cutter-carrier permitting such an adjustment without causing the carrier to bind on the end walls of the chamber in which it operates.

In Fig. 7 I have illustrated my invention embodied in a machine that is provided with a cutter-carrier which travels in a circular path in passing through the work. The cutter-carrier A' of said machine is provided with a piston 37 that projects into a chamber 38 having curved end walls that permit the carrier to move in a circular path when it reciprocates, said carrier being connected to the stationary frame of the machine by means of guide links 39.

In some types of machines it is preferable to provide means for automatically arresting the downward movement of the cutter-carrier after the cutter has passed through the work. One of the means that can be used for this purpose is illustrated in Fig. 8, and consists of a device 40 connected to the cutter-carrier A, preferably by a ball and socket joint, and a valve 41 arranged in such a position that the device 40 will open it and thus permit the pressure to escape automatically through the port 42 when the cutter-carrier reaches a certain position, thereby causing the cutter-carrier to slow down or come to rest.

While I have herein shown my invention embodied in a cutting machine provided with a cutter that reciprocates in a vertical plane, I do not wish it to be understood that my broad idea is limited to this exact construction for, if desired, the cutter could be arranged to operate in a horizontal plane or it could be moved upwardly into engagement with the work instead of downwardly onto the work, as herein shown. Furthermore, I do not wish to be understood as limiting my invention to a cutting machine or to a machine having a single tool mounted on the carrier, for this same idea could be embodied in a machine having a carrier provided with a plurality of work-engaging tools such, for example, as dies.

While it is preferable to have the piston extend approximately the entire length of the work-engaging tool, it will, of course, be obvious that these proportions could be varied without departing from my invention.

Having thus described my invention, what I claim as new and desire to secure by Letters Patent is:

1. In a machine of the class described, an approximately oblong-shaped cylinder provided with an open end that is presented toward the work being operated on, and an approximately oblong-shaped piston reciprocatingly mounted in said cylinder and carrying a tool.

2. In a machine of the class described, a comparatively long and narrow cylinder having an open end that is presented toward the work being operated on, a tool, a tool-carrier having a piston that conforms to the shape of said cylinder and being reciprocatingly mounted inside of same, and means for introducing an expansible medium between the inner end of said piston and the end wall of said cylinder.

3. In a machine of the character described, a pair of cylinders having open ends that are presented toward the work being operated on, pistons reciprocatingly mounted in said cylinders, a work clamp mounted on one of said pistons and a tool mounted on the other piston, and means for introducing an expansible medium between the inner ends of said pistons and the end walls of the cylinders in which they are arranged.

4. In a machine of the class described, a plurality of approximately oblong-shaped cylinders having open ends that are presented toward the work being operated on, pistons arranged in said cylinders, a work clamp connected to the lower end of one of said pistons and extending longitudinally thereof, and a tool connected to the other piston and extending parallel to said work clamp 5. In a machine of the character described, an approximately oblong-shaped cylinder having an open end that is presented toward the work being operated on, and a tool-carrier arranged in said cylinder and consisting of a web that is provided on its longitudinal edges with flanges which bear against the side walls of said cylinder.

6. In a machine of the class described, a work support, a plurality of cylinders having open ends presented toward said support, a work-clamp-carrier and a tool-carrier provided with pistons that project into said cylinders, means for normally holding said pistons in said cylinders, and means for introducing an expansible medium between the inner ends of said pistons and the end walls of said cylinders to force the pistons outwardly.

7. In a cutting machine, a cylinder having an open end that is presented toward the work being operated on, a knife-bar, a web to which said knife-bar is connected, a head on said web that fits snugly against the side walls of said cylinder, and means for introducing an expansible medium between said head and the end wall of the cylinder.

8. A cutting machine provided with a work-clamp, a cutter arranged in sliding engagement with one face of said work-clamp, reciprocating pistons to which said work-clamp and cutter are directly connected, cylinders for said pistons having open ends that are presented toward the work being operated on, and means for introducing an expansible medium between the inner ends of said pistons and the end walls of said cylinders.

9. A cutting machine provided with side frames, members on said side frames that form a cylinder which has an open end that is presented toward the work being operated on, a piston reciprocatingly mounted in said chamber, and a work-engaging tool or device connected directly to said piston and extending longitudinally thereof.

10. A cutting machine provided with a work-support, a work-engaging tool, an approximately oblong-shaped chamber or cylinder arranged above said work-support and having its lower end open, an oblong-shaped piston reciprocatingly mounted in said cylinder and extending approximately the entire length of said tool, and means for introducing an expansible medium between the inner end of said piston and the end wall of said cylinder.

11. A cutting machine provided with a work-support, a plurality of chambers or cylinders located between the side frames of the machine and arranged above said work-support, the lower ends of said chambers being open, and pistons mounted in said chambers and having a work-clamp and a cutter directly connected thereto.

12. A cutting machine provided with side frames, a division plate extending transversely between said side frames, front and rear cover plates that coöperate with said division plate to form two open-ended chambers or cylinders, pistons reciprocatingly mounted in said chambers, a cutter carried by one of said pistons and a work-clamp carried by the other piston, and means for introducing an expansible medium into said chambers above said pistons.

13. A cutting machine provided with a reciprocating cutter-carrier, an open-ended chamber or cylinder in which said carrier is reciprocatingly mounted, means for supplying an expansible medium to said chamber to cause said carrier to move downwardly, and means for causing said carrier to move transversely when it is traveling downwardly.

14. A cutting machine provided with side frames, a division plate arranged between said side frames and provided at its upper edge with laterally projecting flanges, cover plates that coöperate with said division plate to form two open-ended chambers, a work-clamp-carrier and a cutter-carrier projecting upwardly into said chambers and having heads that bear snugly against the walls of said chambers, and means for admitting and exhausting an expansible medium to and from said chambers.

15. A cutting machine having side frames that are provided with inclined guides, a knife-bar provided at its end with inclined portions that slide between said guides, a piston on said knife-bar, and a chamber or cylinder for said piston having an open end that is presented toward the work being operated on.

16. A cutting machine having side frames that are provided with inclined guides, a cutter-bar provided at its ends with devices that coöperate with said guides, means for moving said devices to adjust the cutter-bar, a piston on said cutter-bar having a long narrow head whose opposite ends are rounded, and a chamber or cylinder for receiving said piston, the end walls of said chamber being arranged at the same angle as the inclined guides on the side frames.

17. A cutting machine provided with a chamber or cylinder, a piston arranged in said chamber, a work-engaging tool or device mounted directly on said piston, means for supplying an expansible medium to said chamber to cause said piston to move downwardly, and automatic means for permitting said medium to exhaust from said chamber when said piston reaches a certain position.

18. A cutting machine provided with an open-ended chamber or cylinder, a tool-carrier reciprocatingly mounted in said chamber, means for introducing an expansible medium into said chamber above said carrier so as to cause the carrier to move toward the work being operated on, and automatic means for arresting the movement of said carrier when it reaches a certain position.

19. A cutting machine provided with side frames that have inclined guideways, a knife-bar having devices that project into said guideways, a piston on said knife-bar, a cylinder or chamber into which said piston projects, and means for adjusting the guiding devices on said knife-bar so as to arrange said knife in a perfectly horizontal position.

In testimony whereof I hereunto affix my signature in the presence of two witnesses, this second day of February 1910.

CHARLES H. REEDER.

Witnesses:
    WELLS L. CHURCH,
    GEORGE BAKEWELL.